United States Patent [19]

Lefevre

[11] Patent Number: 4,815,853
[45] Date of Patent: Mar. 28, 1989

[54] THREE-AXIS FIBER-OPTIC RING INTERFEROMETER

[75] Inventor: Hervé Lefevre, Paris, France
[73] Assignee: Thomson-C.S.F., Paris, France
[21] Appl. No.: 105,178
[22] Filed: Oct. 5, 1987
[30] Foreign Application Priority Data Oct. 14, 1986 [FR] France ............... 86 14257

[51] Int. Cl.4 .................... G01B 9/02
[52] U.S. Cl. ................ 356/350; 356/345
[58] Field of Search ............... 356/350, 345

[56] References Cited

U.S. PATENT DOCUMENTS 4,315,693 2/1982 Walker .
4,585,347 4/1986 Auch et al. .......... 356/350
4,632,551 12/1986 Pavlath ............. 356/345

FOREIGN PATENT DOCUMENTS

0040004 11/1981 European Pat. Off. .

Primary Examiner—Vincent P. McGraw
Assistant Examiner—S. A. Turner
Attorney, Agent, or Firm—Roland Plottel

[57] ABSTRACT

A three-axis fiber-optic interferometer as applicable in particular to a gyrometer comprises three optical fibers forming rings disposed along three different axes. The three optical fibers are fed by a light beam emitted by a single source. A single interference photodetector receives the light beam after transit through the different fibers. Coupling devices couple the second fiber to the first fiber and the third fiber to the second fiber.

10 Claims, 6 Drawing Sheets

FIG_1 PRIOR ART

PRIOR ART FIG_2

FIG_3

FIG_5

FIG_6

FIG_7

FIG_8

FIG_9

FIG_10

THREE-AXIS FIBER-OPTIC RING INTERFEROMETER

BACKGROUND OF THE INVENTION

1. Field of the Invention

This invention relates to a three-axis fiber-optic interferometer for carrying out detections along three axes and preferably along three orthogonal axes. This device thus performs a measurement of the three components along three axes, of a disturbance which has an unknown direction and which is liable to affect the propagation of a light beam.

2. Description of the Prior Art

An interferometer of the prior art mainly comprises a light-energy source usually consisting of a laser, an optical device composed either of a certain number of mirrors or of a fiber wound in a flat coil and forming a waveguide, a light-splitting and mixing device and a device for detecting and processing the detected signal.

It is known that, in these interferometers, there exist two waves which emerge from the light-splitting devices and travel in opposite directions on the same optical path.

A basic property of ring interferometers is that of reciprocity which can be expressed as follows: any disturbance of the optical path affects both waves in a similar manner despite the fact that these two waves are not subjected to this disturbance in the same direction.

There are, however, two types of disturbances which affect reciprocity.

In one of these two types, the disturbances vary in time over a period which is comparable with the time taken by the waves to propagate along the optical path of the interferometer. The other type consists of the so-called "nonreciprocal" disturbances which produce different effects on the waves, depending on whether they propagate either in one direction or in another along the optical path. The effects considered are physical effects which destroy the symmetry of the medium in which the waves propagate.

Two known effects are subject to the second type of disturbance:

the Faraday effect or colinear magnetooptic effect whereby a magnetic field produces a preferential electron spin orientation in an optical material;

the Sagnac effect or relativistic inertial effect in which rotation of the interferometer with respect to the inertial space destroy the symmetry of the propagation time. This effect is profitably employed in the construction of gyrometers in particular.

Should there be no occurrence of any "non-reciprocal" disturbances, the difference in phase between the two waves which recombine in the light-splitting and mixing device after traveling along the optical path is zero. The detecting and processing device detects signals representing the optical power of the composite wave obtained after recombination.

When the direction of the disturbance to be measured is not known, in order to measure the value of this disturbance and to determine its direction, it is necessary in accordance with the prior art to carry out measurements in a number of directions or else to employ a number of interferometers.

The interferometer in accordance with the invention differs from the prior art in that it makes provision for series multiplexing of three different axes in a fiber interferometer which makes use of only one source, a single detector and a single integrated optical circuit comprising a Y-junction, a phase modulator and a polarizer. This design concept clearly permits a reduction of the electric connection system and thus results in a more compact assembly.

SUMMARY OF THE INVENTION

The invention is therefore concerned with a three-axis fiber-optic interferometer comprising a first single-mode optical fiber forming a first ring disposed along a first axis, means for emitting radiation of coherent light energy having a predetermined wavelength, first means for splitting and mixing the radiation in order to ensure that the emitted coherent light energy is directed simultaneously and in equal parts to a first and a second end of the first single-mode optical fiber, that the radiations emerging from the two ends of the single-mode optical fiber are recombined in the form of interference radiation and that said interference radiation is retransmitted to an interference photodetector, the fiber-optic interferometer being distinguished by the fact that it comprises in addition:

a second single-mode optical fiber forming a second ring disposed along a second axis and having a first end and a second end;

a first coupling device for coupling said ends of the second fiber to a portion of the first fiber in such a manner as to ensure on the one hand that a fraction of the radiation which travels in a first direction within the first fiber is collected by the first end of the second fiber and on the other hand that a fraction of the radiation which travels in a direction opposite to the first is collected by the second end of the second fiber, said radiation fractions being retransmitted to the first fiber after transit through the second fiber;

a third single-mode optical fiber forming a third ring disposed along a third axis and having a first end and a second end;

a second coupling means for coupling said ends of the third fiber to a portion of the second fiber in such a manner as to ensure that a fraction of the radiation which travels in a first direction within the second fiber is collected by one end of the third fiber and that a fraction of the radiation which travels in a direction opposite to the first is collected by the other end of the third fiber, said radiation fractions being retransmitted to the second fiber after transit through the third fiber.

DETAILED DESCRIPTION OF THE INVENTION

Figure 1:
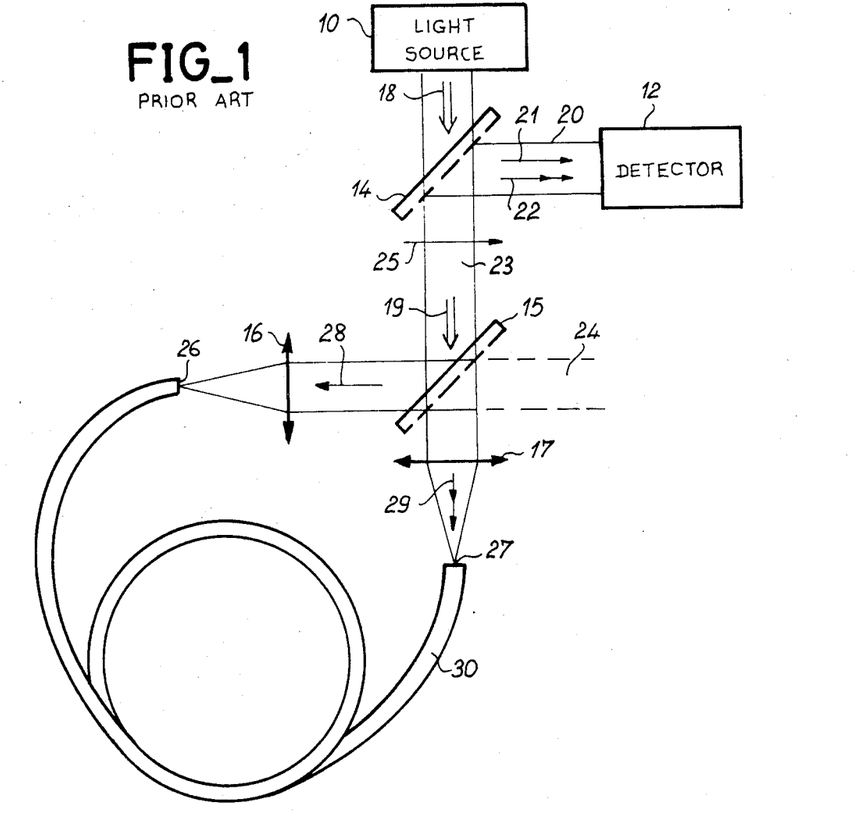
FIG. 1 illustrates one example of construction of an interferometer in accordance with the prior art.

The general diagram of FIG. 1 shows the configuration of a ring interferometer in accordance with the prior art as described in French patent Application No. 80 21677 filed on Oct. 10, 1980. The optical path of the interferometer is formed of single-mode optical fiber but the central portion of this instrument is made up of conventional optical elements.

The ring input is materialized by the semitransparent plate 15. The incident beam 19 originating from the light source 10 arrives on the semitransparent plate 15 after passing through the semitransparent plate 14. The semiconducting plate 15 reflects part of the incident beam 19 into the end 26 of an optical fiber 30 after focusing by a lens 16 and transmits the other part of said beam into the other end 27 of the fiber 30 after focusing by a lens 17.

The first beam 28 travels along the ring of the interferometer in one direction whilst the other beam 29 passes in the opposite direction. These two beams then arrive on the semitransparent plate 15.

The first beam 28 is transmitted into the arm 23 of the interferometer and is partially reflected into the arm 24. The same applies to the second beam. Two portions of these two beams therefore interfere within the arm 23.

When no nonreciprocal disturbances occur within the ring, the interference of the two beams received within the arm 23 on the return path gives rise to a signal of maximum value.

By interposing a mode filter (not shown) within the arm 23, the interferometer is made strictly reciprocal and is traversed by a wave contained in a single optical mode.

After transit through the optical loop of the interferometer and recombination by the beam-splitting plate 15, the optical energy fraction obtained by interference of the two waves in the arm 23 of the interferometer exhibits a complex mode structure. In the absence of nonlinear phenomena and naturally in the absence of nonreciprocal phenomena proper, the energy fraction contained both on the outgoing and return path in this same mode is linearly independent of the remainder of the optical energy: it is just as if this residual energy did not exist and the conditions of mode unicity which are necessary and sufficient for ensuring strict reciprocity of the device are satisfied.

Thus the two beams which have passed through the fiber in opposite directions then return into the arm 23 of the interferometer through the semitransparent plate 15 and are separated from the incident beam 19 by the semitransparent plate 14 which sends them partly into the arm 20 in which the interference signal is detected by the detector 12.

Figure 2:
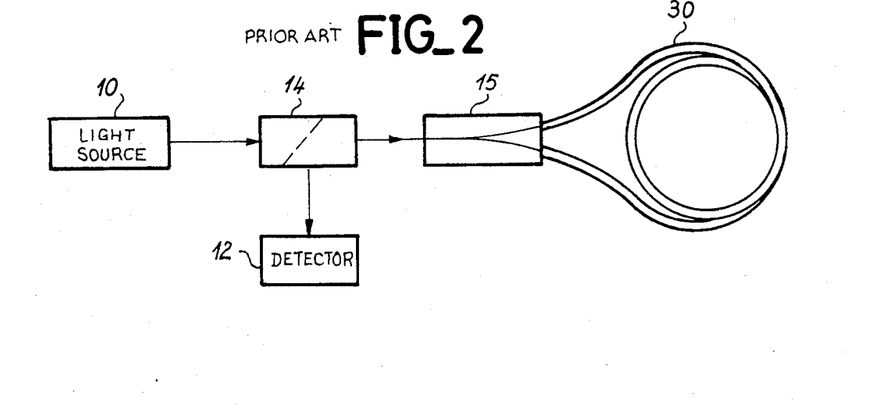
FIG. 2 illustrates another example of construction of an interferometer in accordance with the prior art.

As shown in FIG. 2, the system can be constructed by means of components which are fabricated in some instances by means of techniques in the field of integrated optics.

In this figure, the elements which perform the same functions in both systems are designated by the same references. Thus the source 10, the ring of the interferometer 30 and the detector 12 are again shown in this figure. The beam-splitting plate 14 of FIG. 1 has been constructed in the form of a shunt T-junction as described in French patent Application No. 85 16600 filed on Nov. 8, 1985. In accordance with known practice, the beam-splitting plate 15 of FIG. 1 has also been fabricated in the integrated optics technology in the form of a splitter. The connections between the different elements of FIG. 2 can also be fabricated in integrated optics by means of waveguides which are also well-known in this technique.

In order to measure a disturbance whose direction is unknown, known techniques entail the need to carry out measurements in several known directions (three directions, for example) in order to determine the components of the disturbance in these directions or else (which amounts to the same thing) to provide a number of interferometers as described in the foregoing and oriented in known directions. The system of the invention makes it possible to perform a measurement of this kind with a single device having only one light source and only one detector.

Figure 3:
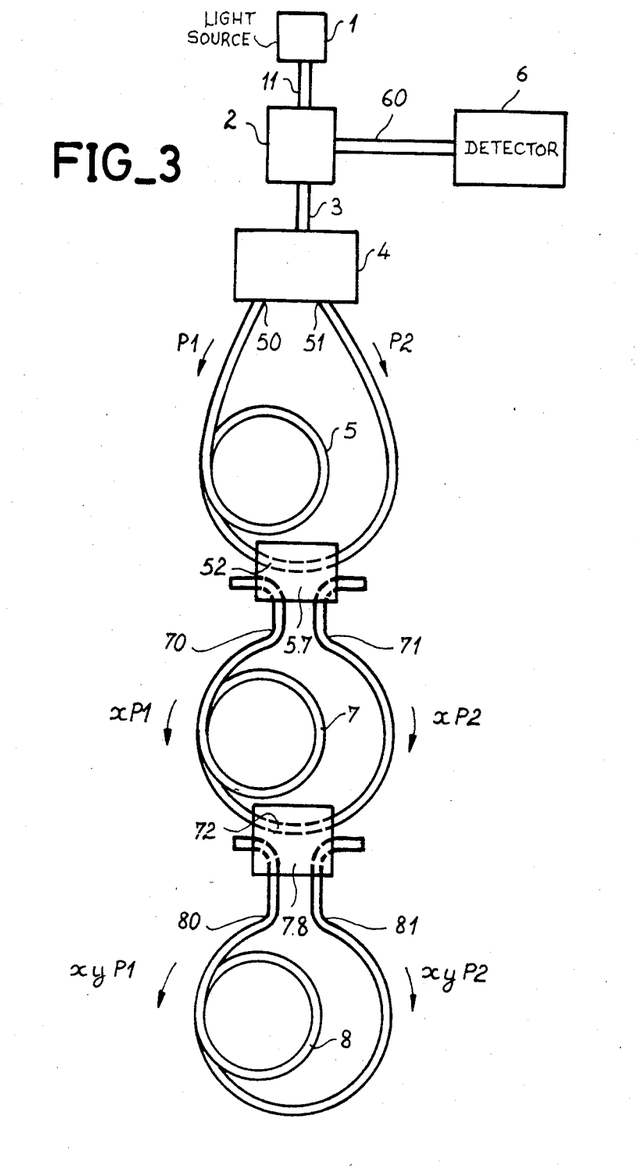
FIG. 3 illustrates one example of construction of an interferometer in accordance with the invention.

Referring now to FIG. 3, one example of construction of an interferometer of this type will be described.

This interferometer has a light source 1 which emits a beam of polarized light. A shunt T-junction 2 such as the junction 14 of FIG. 2 receives said light beam via a light guide 11. A beam-splitter 4 is coupled by a light guide 3 to the shunt T-junction 2 and receives from this latter the light beam emitted by the source 1. On the other hand, the shunt T-junction 2 retransmits to a detector 6 via a light guide 60 all or part of the light radiation which comes from the beam-splitter 4. The detector 6 can also be associated directly with the shunt T-junction 2.

The beam-splitter 4 splits the beam from the source 1 into two parts. Each part of the beam is transmitted to one end 50 and 51 of an optical fiber 5. The fiber 5 which has been shown in the form of a loop is therefore traversed by two contrarotating waves P1 and P2.

A portion 52 of the fiber 5 is coupled by means of a coupling devices 5.7 to the two ends 70 and 71 of a fiber 7 which is also represented in the form of a loop. This coupling is carried out in such a manner as to ensure that the light wave P1 coming from the end 50 is coupled into the end 70 of the fiber 7. A fraction xP1 of the light wave P1 is therefore transmitted to the fiber 7 and travels along this latter as indicated in the figure. The other fraction $(1-x)P1$ (not shown in the figure) continues on its path of travel within the fiber 5 towards the fiber end 51.

The coupling device 5.7 also makes it possible to couple the light wave P2 emerging from the fiber end 51 int the end 71 of the fiber 7. A fraction xP2 of the light wave P2 is therefore transmitted to the fiber 7 and passes along this latter as indicated in the figure. The other fraction $(1-x)$ P2 (not shown in the figure) continues on its path of travel within the fiber 5 towards the fiber end 50.

A portion 72 of the fiber 7 is coupled in like manner by means of a coupling device 7.8 into the two ends 80 and 81 of a fiber 8 which is also represented in the form of a loop. This coupling is such that a fraction xyP1 of the wave xP1 is transmitted to the fiber 8 and travels along this latter as indicated in FIG. 3.

The other fraction $(1-y)$ xP1 of the wave xP1 continues on its path of travel within the fiber 7 towards the fiber end 71.

Coupling of the device 7.8 is also such that a fraction xyP2 of the wave xP2 is transmitted to the fiber 8 and travels along this latter as indicated in FIG. 3. The other fraction $(1-y)$ xP2 of the xP2 continues to travel within the fiber 7 towards the fiber end 70.

The wave fractions $(1-y)$ xP1 and $(1-y)$ xP2 reach the fiber ends 71 and 70 respectively and are coupled by the coupling device 5.7 to the fiber 7. Part of these wave fractions is retransmitted through the fiber 5 to the fiber ends 50 and 51.

After transit through the fiber 8, the wave fractions xyP and xyP2 reach the fiber ends 81 and 80 respectively and are coupled into the fiber 7. Part of these wave fractions is retransmitted to the fiber 7 and passes along this latter up to the fiber ends 70 and 71 at which the coupling device 5.7 again retransmits part of said wave fractions through the fiber 5 to the ends 50 and 51.

The beam-splitter 4 therefore receives different return waves and retransmits them to the shunt T-junction 2 which retransmits them to the detector 6.

In FIG. 3, the coupling devices 5.7 and 7.8 are each represented as a single component. However, in a preferred embodiment of the invention, they are each formed by means of two couplers 5.70 and 5.71 in the case of the device 5.7, and 7.80 and 7.81 in the case of the device 7.8. These couplers can be constructed in accordance with known methods such as, for example, the method of integrated fabrication as described in French patent Application No. 80 21677 filed on Oct. 10, 1980.

Figure 4:
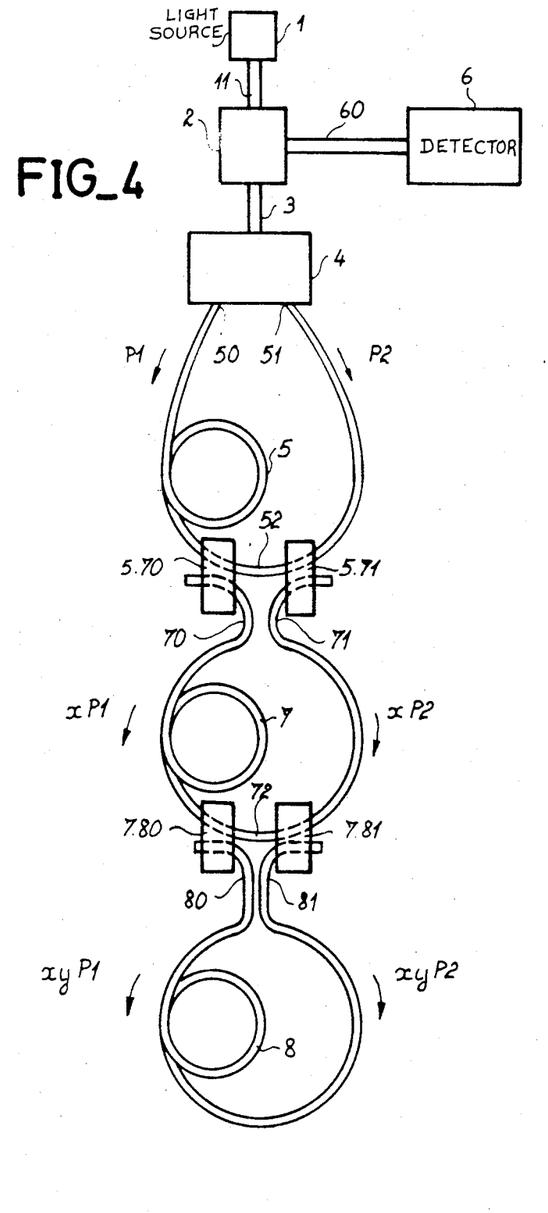
FIG. 4 illustrates another example of construction of an interferometer in accordance with the invention.
Figure 5:
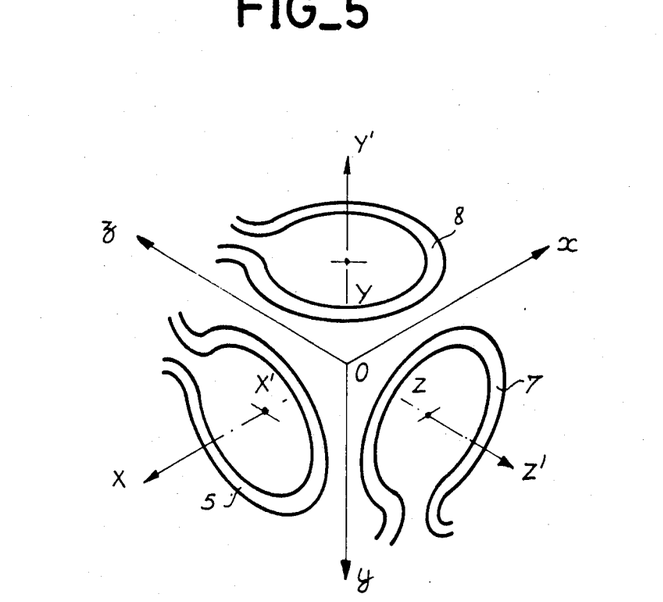
FIG. 5 illustrates one example of arrangement of fiber coils in accordance with the invention.

In FIGS. 3 and 4, for reasons of convenience of illustration, the three fibers 5, 7, 8 have been represented in the same plane. However, in order to be in a position to measure the components of a disturbance in several directions, these fibers must be disposed in different planes. For example, as shown in FIG. 5, a preferred embodiment of the invention will consist in disposing the fiber loops 5, 7, 8 in planes zOy, xOy and xOz respectively.

The fiber loops 5, 7, 8 make it possible to measure disturbance components along the axes X—X', Y—Y', Z—Z' of these loops which are orthogonal to each other.

The fiber loops 5, 7, 8 will be arranged in the form of coils in order to have a substantial length of fiber within a small volume.

By choosing coils of equal length and by modulating the intensity of the source 1 with a gate having a time-duration t and a repetition period 3t, where t is the time of propagation within a coil (1 μs per 200 meters), the light which has followed the different paths returns at different instants, thus making it possible to multiplex in series and in time the signal produced by rotation of each coil.

Figure 6:
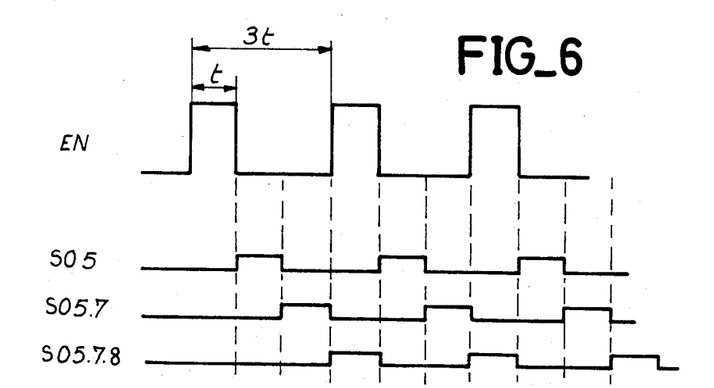
FIGS. 6 to 10 are signal diagrams illustrating the operation of an interferometer in accordance with the invention.

In FIG. 6, there is shown a light signal EN emitted by the light source 1. This signal has a time-duration t and a repetition period 3t.

As explained earlier, a light wave emitted by the source 1 is transmitted to both ends 50 and 51 of the fiber 5 and returns at least partly, after passing either through the fiber 5 alone or through the fiber 5 and the fiber 7 or else through all three fibers 5, 7 and 8.

After passing through the fiber 5 alone, the collected signal is shown on the line SO5. In actual fact, the signal of line SO5 represents the interference of the contrarotating waves which have passed through the 5 has a duration t equal to the duration of the signal EN, the signal SO5 is displaced by a time interval t with respect to the signal EN.

After passing through the fibers 5 and 7, the collected signal is shown on the line SO5.7. This signal also represents an interference of the contrarotating waves which have passed through the fibers 5 and 6 and is displaced by an interval 2t with respect to the signal EN.

Finally, after passing through the fibers 5, 7 and 8, the signal is shown on the line SO5.7.8 and represents the interference of the contrarotating waves after transit through the fibers 5, 7 and 8. This signal is displaced by 3t with respect to the signal EN.

French patent Application No. 84 09311 filed on June 14, 1984 describes a device for measuring phase shift in a ring interferometer by means of a phase-ramp system. When this system is employed, the detector 6 which receives the signals SO5, SO5.7 and SO5.7.8 is capable of performing a phase-ramp measurement.

To this end, a square-law phase modulation having a period 6t and a switchover which takes place just before a light input permits biasing of the three multiplexed interferometers.

Figure 7:
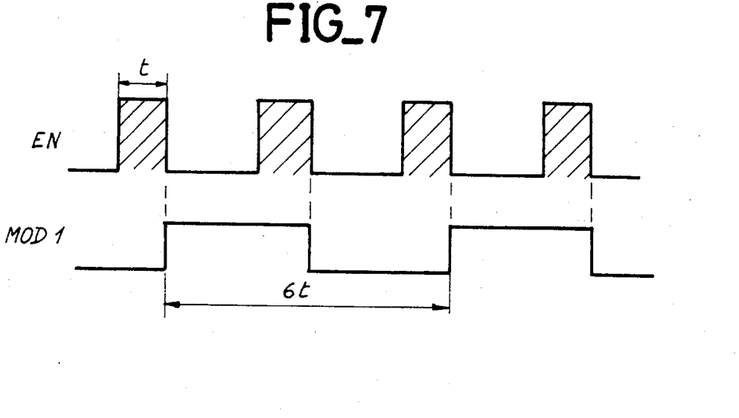

In FIG. 7, there is shown the signal EN of FIG. 6 and the modulation signal MOD1 having a period 6t.

Figure 8:
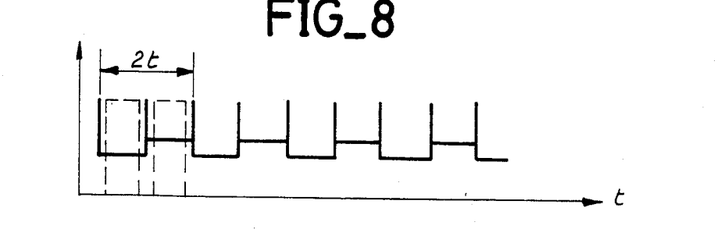

In a single-axis gyrometer, the rotation signal obtained with a phase modulation having a period 2t is shown in FIG. 8.

Figure 9:
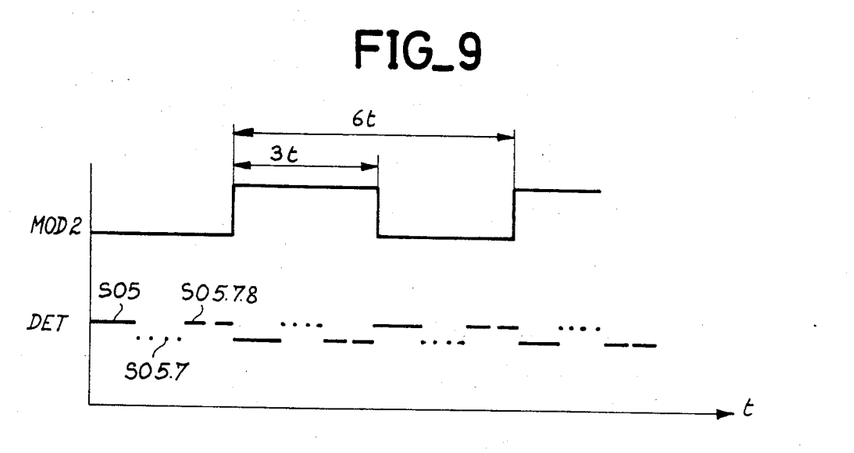

In accordance with the invention, the signal of the three fibers being modulated by a signal having a period 6t such as the signal represented by the signal MOD2 of FIG. 9, the signals obtained after transit through the fibers are represented on the line DET of FIG. 9. On this line DET, the signal which has passed solely through the fiber 5 is represented by a continuous line. The signal which has passed through the fibers 5 and 7 is represented by a series of dots. The signal which has passed through the fibers 5, 7 and 8 is represented by long dashes.

The method of digital-phase-ramp feedback as described in French patent Application No. 84 09311 therefore remains valid. The ramp which is synchronous with the modulation compensates for rotation of the coil 5 in the case of the path 5 but also in the case of the paths 5+7 and 5+7+8. The ramp delayed by a time interval t compensates the coil 7 in respect of the paths 5+7 and 5+7+8. The ramp delayed by a time interval 2t compensates the coil 8 in respect of the path 5+7+8.

Figure 10:
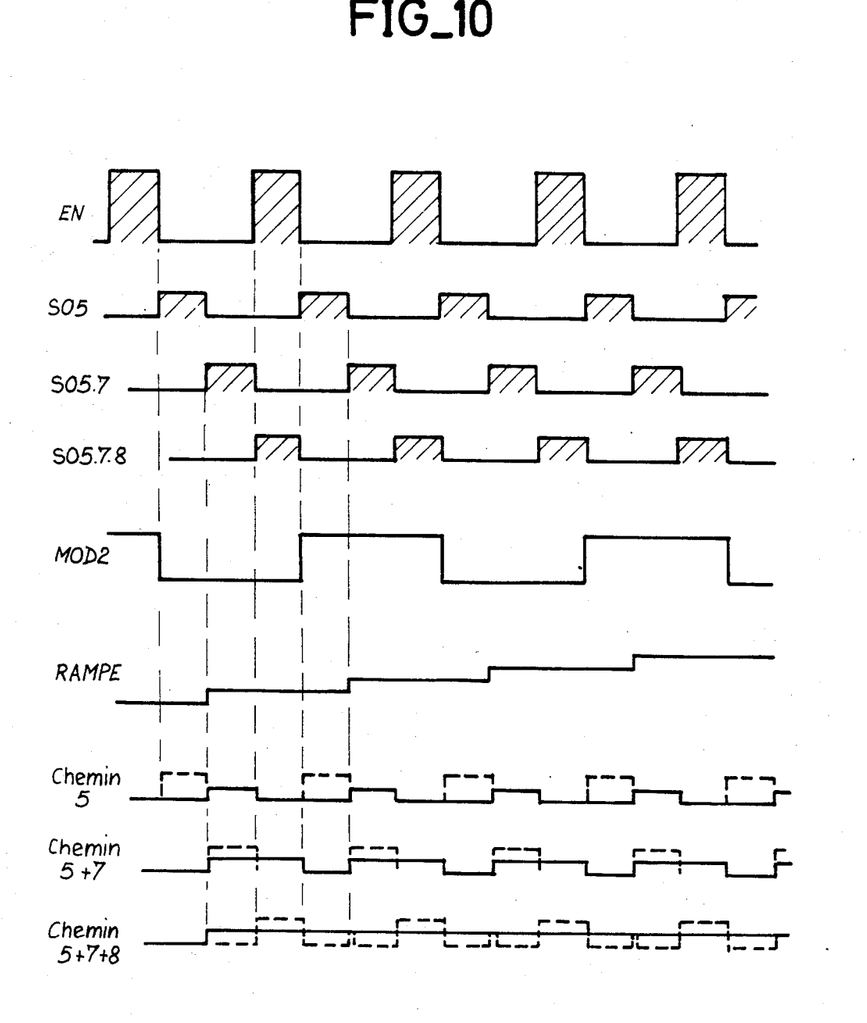

By way of example, FIG. 10 gives the case of the second ramp delayed by the time interval t. This ramp does not produce action on the path of the coil 5 since there is no light when this ramp produces a phase shift. On the other hand, said ramp does produce action on the paths of the coils 5+7 and 5+7+8.

From the point of view of light-emitting power, the system is optimized when the couplers between the fibers 5 and 7 are ⅓ transmitted ⅔ coupled and those between the fibers 7 and 8 are ½—½. There returns from each path only one-ninth of the power which would be available within a single-axis gyrometer if no consideration is given to the additional losses of the coils and the couplers. Since the system is limited by photon noise, the signal-to-noise ratio is accordingly reduced by a factor of 3.

It should finally be noted that, in order to avoid electromagnetic radiation and ground loop problems, the light signal extracted from the shunt T-junction can be coupled into a multimode fiber which will transmit this signal to a detector forming part of the electronic processing circuitry.

Finally, in a preferred embodiment of the invention, the couplers 5.70, 5.71, 5.80, 5.81 will be located at the center of coils 5 and 7 in order to establish symmetry and in order to guard against any deficiencies arising, for example, from differences in temperature.

It is wholly apparent that the foregoing description has been given solely by way of example. Further examples of construction may be contemplated without thereby departing either from the scope or the spirit of the invention.

What is claimed is:

1. A three-axis fiber-optic interferometer for measuring the components of a disturbance in three different directions comprising a first single-mode optical fiber forming a first ring disposed along a first axis, means for emitting radiation of coherent light energy having a predetermined wavelength, first means for splitting and mixing said radiation in order to ensure that the emitted coherent light energy is directed simultaneously and in equal parts to a first and a second end of said first single-mode optical fiber, that the radiations emerging from the two ends of said first single-mode optical fiber are recombined in the form of interference radiation, and that said interference radiation is retransmitted to an interference photodetector, and further comprising:

a second single-mode optical fiber forming a second ring disposed along a second axis and having a first end and a second end;

a first coupling device for coupling said ends of the second fiber to a portion of the first fiber in such a manner as to ensure on the one hand that a fraction of the radiation which travels in a first direction within the first fiber is collected by the first end of the second fiber and on the other hand that a fraction of the radiation which travels in a direction opposite to the first within the first fiber is collected by the second end of the second fiber, said radiation fractions being retransmitted to the first fiber after transit through said second fiber;

a third single-mode optical fiber forming a third ring disposed along a third axis and having a first end and a second end;

a second coupling device for coupling said ends of the third fiber to a portion of the second fiber in such a manner as to ensure that a fraction of the radiation which travels in a first direction within the second fiber is collected by one end of the third fiber and that a fraction of the radiation which travels in a direction opposite to the first within the second fiber is collected by the other end of the third fiber, said radiation fractions being retransmitted to the second fiber after transit through said third fiber for retransmission to said first optical fiber.

2. A fiber-optic interferometer according to claim 1, wherein the first axis, the second axis and the third axis are not parallel to each other.

3. A fiber-optic interferometer according to claim 1, wherein the first, second and third axes are orthogonal to each other.

4. A fiber-optic interferometer according to claim 1, wherein:

the first coupling device comprises on the one hand a first coupler which couples the first end of the second fiber to the first fiber in such a manner as to collect part of the radiation which propagates in the first direction of propagation in the first fiber as well as to retransmit at least part of a radiation which emerges from said first end of the second fiber into the first fiber in the second direction of propagation and on the other hand a second coupler which couples the second end of the second fiber in such a manner as to collect part of the radiation which propagates in the second direction of propagation in the first fiber and to retransmit to the first fiber, along the first direction of propagation, radiation which emerges from said second end of the second fiber;

the second coupling device comprises on the one hand a third coupler which couples the first end of the third fiber to the second fiber in such a manner as to collect part of the radiation which comes from the first direction of propagation in the second fiber and to retransmit to the second fiber radiation which emerges from the first end of the third fiber and on the other hand a fourth coupler which couples the second end of the third fiber in such a manner as to collect part of the radiation coming from the second direction of propagation in the second fiber and to retransmit to the second fiber radiation which emerges from the second end of said third fiber.

5. A fiber-optic interferometer according to claim 4, wherein the coefficients of coupling of the first coupler and of the second coupler of the first fiber to each end of the second fiber are both substantially equal to two-thirds.

6. A fiber-optic interferometer according to claim 4, wherein the coefficients of coupling of the third coupler and of the fourth coupler of the second fiber to each end of the third fiber are both substantially equal to one-half.

7. A fiber-optic interferometer according to claim 1, wherein the first fiber, the second fiber and the third fiber have equal lengths.

8. A fiber-optic interferometer according to claim 7, wherein the time of propagation of one light pulse in each coil has a predetermined time value, the intensity of the light source being modulated by means of a gate having a time-duration equal to said predetermined time value and the gate-operation repetition period is equal to three times said predetermined time value.

9. A fiber-optic interferometer according to claim 8, wherein the interference photodetector device comprises means for detection by phase modulation in which the period of phase modulation has a value equal to six times the aforesaid predetermined time value.

10. A fiber-optic interferometer according to claim 8, wherein delayed digital phase ramps permit operation of the system in a closed loop.

* * * * *